March 25, 1941.  S. T. MALTBY  2,236,150
TUBE CUTTING MACHINE
Filed Oct. 25, 1940  2 Sheets-Sheet 1
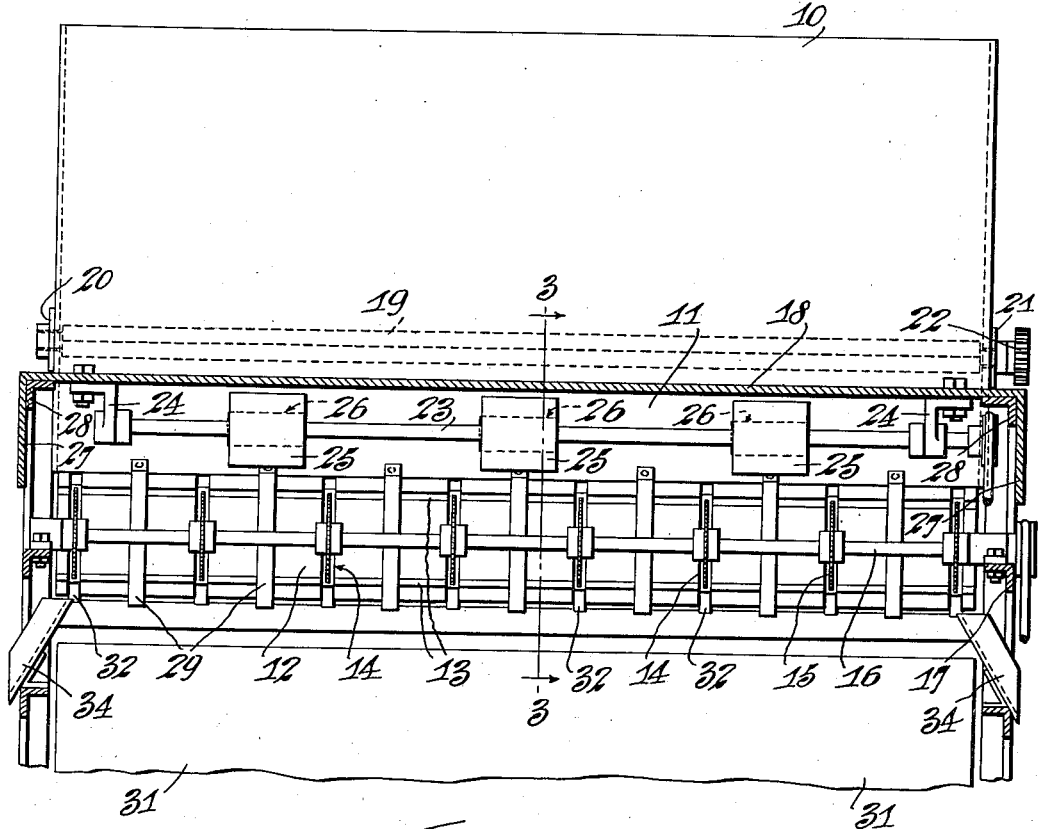
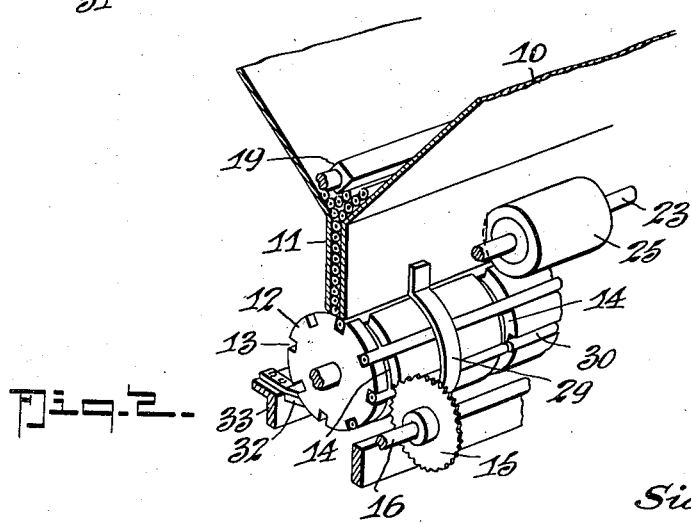
Inventor
Sidney T. Maltby.
By
James H. Littlehales
Attorney

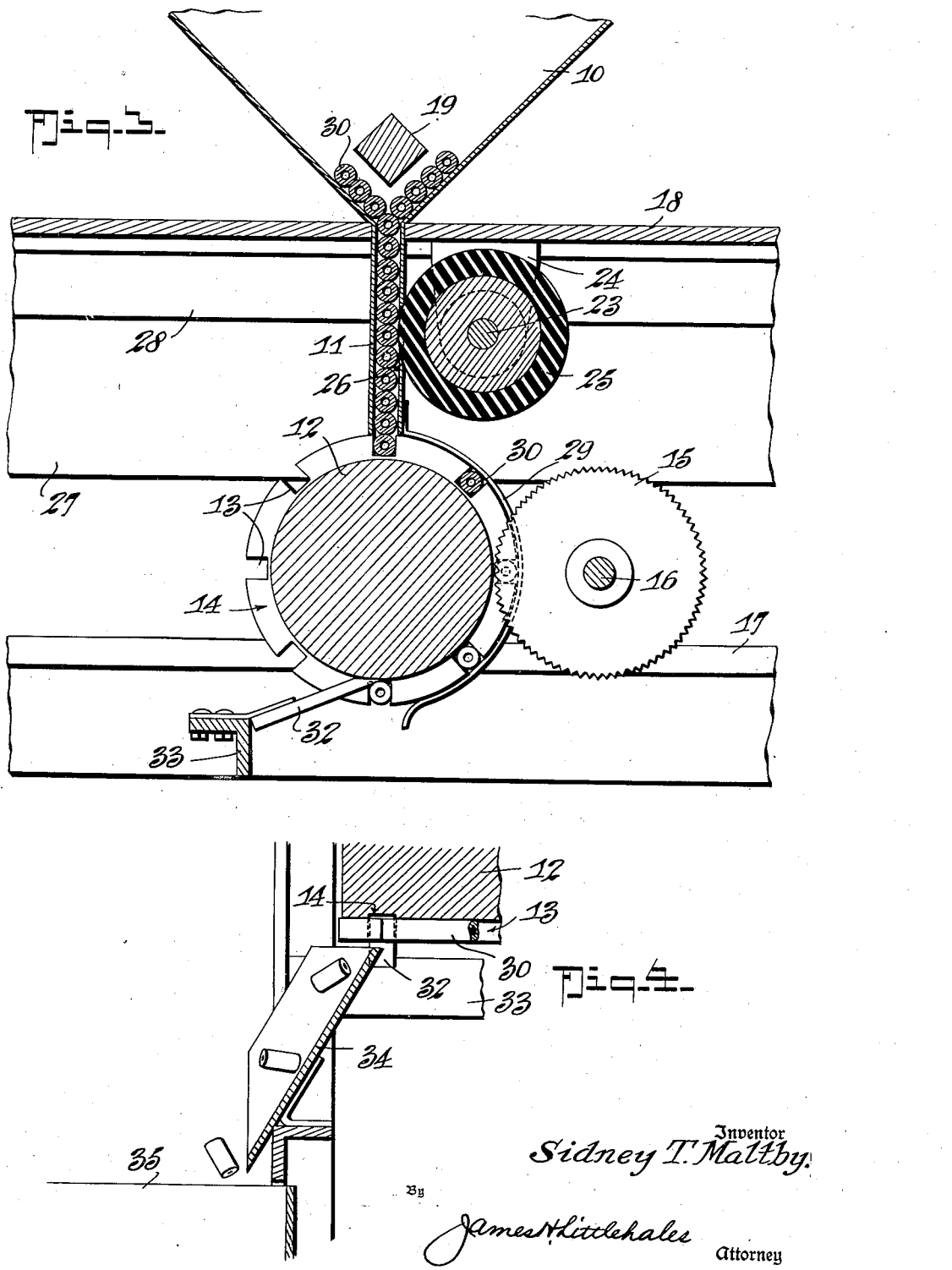

Patented Mar. 25, 1941

2,236,150

UNITED STATES PATENT OFFICE 2,236,150

TUBE CUTTING MACHINE

Sidney T. Maltby, Washington, D. C., assignor to Stone Paper Tube Company, Washington, D. C., a corporation of Delaware Application October 25, 1940, Serial No. 362,877

5 Claims. (Cl. 164—61)

This invention relates to tube cutting machines, and more particularly to a machine wherein lengths of paper tubing are fed to a cylindrical carrier which is grooved to receive them and which in rotation presents the tubes successively to a series of rotating knives or saws to be cut into smaller lengths.

One object which is achieved by my invention is to cut paper tubes into a plurality of smaller lengths in a single operation, and to present the tubes for cutting successively as the same are advanced by a carrier into the paths of a series of rotating cutters.

Another object is to provide such a machine which is semi-automatic in its operation, requiring only that the operator replenish the supply of tubes to be cut, such tubes being automatically agitated in a hopper to lie in parallelism and then fed by positively driven means to the mouth of the hopper into longitudinal grooves of an underlying rotatable carrier which presents them in succession to a series of cutters.

A further object of the invention is to provide a machine which will facilitate cutting of lengths of tubing into accurately sized smaller lengths, and for accomplishing the cutting operation to produce a plurality of small lengths simultaneously at each cut, thereby increasing productive capacity.

A still further object is to provide a machine with means for positively feeding tube lengths to a carrier which conveys them in succession to a cutter.

Other and further objects will be apparent from the following description and drawings, in which Figure 1 is a side view of the tube cutting machine.

Figure 2 is a fragmentary perspective view of the left end of the machine as viewed in Figure 1.

Figure 3 is an enlarged vertical sectional view taken along the line 3—3 of Figure 1.

Figure 4 is a detail view, partly in section, of the construction shown at the lower left in Figure 1.

Referring more particularly to the drawings:

A hopper 10 is formed with a narrow elongated throat 11 which terminates above and closely adjacent to a cylindrical carrier 12 which is adapted to receive lengths of tubing from the hopper and convey them to cutters, as will be described.

The carrier 12 is longitudinally grooved as at 13 to a depth which will receive the tubes to be cut, and is also formed with spaced circumferential grooves 14 throughout its length, the latter being of slightly greater depth than the longitudinal grooves which they intersect in order to provide clearance for the cutters, as will be understood from the showing in Figure 3 of the drawings.

A series of cutters, here shown as driven saws 15, are mounted on a shaft 16 adjacent to the carrier 12 so that the saws project into the respective circumferential grooves 14. The shaft 16 may conveniently be supported in bearings mounted in cross members 17, here shown as angle irons.

The hopper 10 which extends through the bed 18 of the machine has an angularly formed agitator 19 mounted within it and journalled as at 20 and 21 in its end walls for rotation through gearing 22. The agitator assists the tubes to arrange themselves in parallelism for discharge through the throat 11 and also prevents the tubes from bridging in the throat.

Beneath the bed 18 is a shaft 23 journalled, as by brackets 24 depending from the bed, such shaft carrying rubber covered rolls 25 which project through slots 26 in one side wall of the hopper throat to contact the tubes passing downwardly therethrough and to force the same by frictional contact into position at the throat discharge to enter the respective grooves 13 of the underlying carrier as these are presented in the rotation of the carrier.

In the embodiment of my invention shown much of the feeding mechanism is enclosed by downwardly extending aprons 27 at the ends of the bed which may be attached thereto, or reinforced, by angle irons 28.

Spring fingers 29 partly encircle the carrier at points intermediate the saws to retain the tubes 30 within their respective grooves during cutting and also to prevent them from rotating with the saw.

As shown in Figure 1, the circumferential grooves 14 are of substantially greater width than the thickness of the saws. Thus, the ends of the tube sections when cut project into such circumferential grooves, and are dislodged for delivery to an underlying receptacle 31 by a series of chisel-like blades 32 which ride in the grooves. These blades may be mounted in any desired manner, here shown by way of illustration upon an angle iron member 33.

The manner in which the cut ends of the tube sections extend into the circumferential grooves is clearly shown in Figure 2, wherein for sake of clearness one of the cutters has been omitted more clearly to illustrate the cut tube section before its removal from the carrier.

It will be understood that the long lengths of tube must be trimmed at the ends to obtain sections of uniform length. In order that the ends may be segregated as waste my invention contemplates the provision of inclined chutes 34 at each end of the machine underlying the end saws to conduct the trim to receptacles as is indicated at 35 in Figure 4, while the uniformly cut sections fall directly down into the receptacle 31 which is positioned beneath the carrier 12.

From the foregoing it will be apparent that my invention provides a machine for cutting tubes into lengths by making a plurality of cuts simultaneously in the tubes as they are carried successively into the path of a series of cutters, the tubes being automatically fed to the carrier by frictional advancing means, and it will further be apparent that although I contemplate the use of this machine for cutting relatively heavy paper tubes such as may be used for wedging the armature slots of electric motors and generators, it is not restricted to operation upon such material. Still further, the arrangement and mounting of parts as shown in the drawings are given by way of illustration only and are not to be construed as limiting the preferred construction to the form shown.

What I claim as my invention, and desire to secure by Letters Patent is:

1. A tube cutting machine comprising hopper means for receiving straight lengths of tubing, means for engaging the tubes and feeding them successively to the hopper discharge outlet, a carrier formed with longitudinal grooves into which said tubes are fed, said carrier further being formed with peripheral grooves at spaced intervals, a series of cutters adapted to project into the peripheral grooves, and means for rotating said carrier to present the tubes successively to said cutters, thereby to cut each of them simultaneously into a plurality of shorter lengths.

2. A tube cutting machine comprising a hopper for receiving lengths of tubing, an agitator in said hopper for arranging the lengths of tube in parallelism, means projecting into the throat of said hopper for engaging the tubes passing through the throat of the hopper and feeding them successively to the hopper discharge outlet, a carrier formed with longitudinal grooves into which said tubes are fed, said carrier further being formed with peripheral grooves at spaced intervals, a series of cutters adapted to project into the peripheral grooves, and means for rotating said carrier to present the tubes successively to said cutters, thereby to cut each of them simultaneously into a plurality of shorter lengths.

3. A tube cutting machine comprising a hopper for receiving straight lengths of tubing, means extending into the throat of said hopper for engaging the tubes passing therethrough and feeding them in succession to the outlet of said hopper, a carrier formed with interrupted longitudinal grooves which receive the tubes fed from the hopper, means for causing said carrier to travel into the paths of a series of cutters which project between the interrupted longitudinal grooves, whereby the tubes are successively cut and each of them is cut simultaneously into a plurality of lengths.

4. A tube cutting machine comprising a hopper for receiving straight lengths of tubing, means extending into the throat of said hopper for frictionally engaging the tubes passing therethrough and urging them in succession to the outlet of said hopper, a carrier formed with interrupted longitudinal grooves which receive the tubes fed from the hopper, means for causing said carrier to travel into the paths of a series of cutters which project between the interrupted longitudinal grooves, whereby the tubes are successively cut and each of them is cut simultaneously into a plurality of lengths.

5. A tube cutting machine comprising a hopper for receiving straight lengths of tubing, an agitator in said hopper for arranging the lengths of tube in parallelism, driven roller means projecting into the throat of said hopper for engaging said tubes and feeding them successively to the hopper discharge outlet, a cylindrical carrier formed with longitudinal grooves into which said tubes are fed, said carrier further being formed with circumferential grooves at spaced intervals in its length, a series of rotary cutters mounted to project into such circumferential grooves, and means for rotating said carrier to present the tubes successively to said cutters, thereby to cut each of them into shorter lengths.

SIDNEY T. MALTBY.